US007567941B2

(12) United States Patent
Sagi et al.

(10) Patent No.: US 7,567,941 B2
(45) Date of Patent: Jul. 28, 2009

(54) DOCUMENT LIFECYCLE TRACKING SYSTEM AND METHOD FOR USE WITH A DOCUMENT PRODUCTION PROCESS

(75) Inventors: Surya R. Sagi, Southbury, CT (US); William G. Hart, Jr., Sandy Hook, CT (US); Bruce J. Barrows, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1536 days.

(21) Appl. No.: 10/280,339

(22) Filed: Oct. 25, 2002

(65) Prior Publication Data

US 2005/0031162 A1 Feb. 10, 2005

Related U.S. Application Data

(60) Provisional application No. 60/343,410, filed on Oct. 26, 2001.

(51) Int. Cl.
*G07B 17/02* (2006.01)
(52) U.S. Cl. ..................................................... 705/404
(58) Field of Classification Search .................. 705/404
See application file for complete search history.

(56) References Cited

U.S. PATENT DOCUMENTS

| | | | | |
|---|---|---|---|---|
| 4,752,675 A | * | 6/1988 | Zetmeir | 235/375 |
| 5,917,925 A | * | 6/1999 | Moore | 382/101 |
| 6,370,521 B1 | * | 4/2002 | Pigos et al. | 707/2 |
| 6,661,530 B1 | * | 12/2003 | Munetomo et al. | 358/1.15 |
| 2001/0036324 A1 | * | 11/2001 | Altman | 382/305 |
| 2002/0010687 A1 | * | 1/2002 | Gawler | 705/401 |
| 2002/0070149 A1 | * | 6/2002 | Schererz et al. | 209/540 |

OTHER PUBLICATIONS

Printing World, "Have Envelopes Been Licked for Direct Mail? Not On Your Life!" Tonbridge, Mar. 30, 1998, p. 42.*

* cited by examiner

*Primary Examiner*—John W Hayes
*Assistant Examiner*—Nathan Erb
(74) *Attorney, Agent, or Firm*—Michael J. Cummings; Angelo N. Chaclas (57) ABSTRACT

A method for monitoring the status of documents created by a large scale document production and management process. The production and management process may be comprised of a plurality of different stages including: utilizing a print stream to generate the documents, printing documents on a printer in accordance with the print stream, and forming completed mail pieces on an inserter from the printed documents in accordance with mail piece creation data files. A monitoring system receives information regarding the status of individual documents within these production and management process stages. A user may then select one of the stages for closer inspection of the status of documents. For the selected stage, status of individual documents is displayed.

21 Claims, 7 Drawing Sheets

DOCUMENT LIFECYCLE TRACKING SYSTEM AND METHOD FOR USE WITH A DOCUMENT PRODUCTION PROCESS

This application claims priority under 35 U.S.C. § 119(e) from U.S. Provisional Application 60/343,410 dated Oct. 26, 2001, titled Document Production Monitoring and Control System, which is hereby incorporated by reference in its entirety.

TECHNICAL FIELD

The present invention relates to a system for monitoring and controlling document production equipment and systems. Such equipment and systems may include high volume printers, inserter machines, mail sorting machines, and the like. The present invention also relates to tracking of mail pieces during delivery by a carrier service.

BACKGROUND

Systems for mass producing mail pieces are well known in the art. Such systems are typically used by organizations such as banks, insurance companies and utility companies for producing a large volume of specific mailings like billing statements, or promotional offers. The starting point for the document production process is a stream of print data generated by the organization wishing to create the mailing. The print streams are usually produced by older, legacy, computer systems that are not easily adapted to do more than provide raw print data that is output as a result of the legacy computer systems' business logic.

The raw print stream data may be manipulated using known print stream manipulation software, such as the Streamweaver™ product of Pitney Bowes Inc. Print stream manipulation software allows users to change the look and content of documents, without requiring changes to the legacy computer systems.

Once print stream manipulation is complete, the print stream may be sent to a high volume printer. Such high volume printing results in large rolls or stacks of documents, usually connected in a continuous web. The webs of documents are transported to an inserter machine to be separated into individual pages and turned into mail pieces. Examples of such inserter systems are the 8 series and 9 series inserter systems available from Pitney Bowes Inc. of Stamford Conn.

In many respects the typical inserter system resembles a manufacturing assembly line. Sheets and other raw materials (other sheets, enclosures, and envelopes) enter the inserter system as inputs. A plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Each collation of documents processed by the inserter system typically includes a control document having coded control marks printed thereon. Scanners are located throughout the inserter system to sense documents and to allow control for processing of a particular mail piece. The coded marks may be bar codes, UPC code, or the like.

The inserter system control system is coupled to the inserter system's modular components. The control system stores data files identifying how individual mail pieces should be processed. These data files are typically linked to individual mail pieces by the coded marks included on the control documents. As a collation passes through the inserter system, the coded marks on the control document are scanned and the control system directs the modular components to assemble the mail piece as appropriate. Mail pieces such as billing statements will often include a reply document and/or a return envelope that is pre-addressed for delivery back to the originator of the mail piece. Such reply documents and return envelopes may be used to send back payments, or acceptances of offers, or the like.

Once a finished mail piece has been formed by the inserter system, it may be stacked and provided to a carrier service, such as the U.S. Postal Service, for delivery. Often, in order to receive postal discounts, it is advantageous to sort the outgoing mail in accordance postal regulations. Such output sorting devices are well known. Examples of output sorting devices are available from MailCode, Inc.

In delivering documents to their recipients, a number of carriers provide means for tracking the progress of the mail piece. For example, Federal Express and UPS provide tracking capabilities that may be monitored by senders via the Internet. In a similar manner, the U.S. Postal Service can provide PLANET codes on mail pieces which allow for tracking of the mail pieces in the mail stream.

When reply mail pieces are sent back from the recipient to the originator, the reply mail pieces are sorted with an incoming sorter. The incoming sorter can sort incoming mail pieces into bundles to be handled by the same group within the organization. The incoming sorters may also include scanning capabilities to determine if an incoming mail piece is a return mail piece, and such return mail piece may also be sorted accordingly for appropriate handling.

At the various stages of the mail production and management process, sensing devices are in place to help identify the occurrence of errors and mishandling. When an error is found within a stage, the systems typically provide for notification of errors so that corrective action may be taken. Information on processing performance is often provided to local operators.

SUMMARY OF THE INVENTION

For organizations that produce mass quantities of mail, timing and efficiency are often of the essence. To assist in these goals, the present invention utilizes information gathered at the various mail creation and delivery stages. Using this information, mailers can better plan their mailing tasks and provide better responsiveness to customer inquiries. For example, an inserter control system collects data about the efficiency and functioning of the inserter system. Such a control system can monitor and keep statistics about the speed at which the system is operating, and the rate of errors that occur. Such monitoring may utilize data from tracking mail piece control documents through the inserter system. Additional sensors may also be used to provide further independent information. Optical sensors and scanners may be located at input and output locations for the inserter systems to further monitor and record data concerning documents within the inserter processing stage.

It is also important for an organization to be able to identify the status of particular mail pieces. The ability to identify the status of particular mail pieces will assist in determining which mail pieces require additional processing. According to the present information, such information about documents and mail pieces at multiple stages in the mail production and management process is preferably provided to a centralized location, to provide the greatest capability for planning, coordination and analysis.

Information about the status of mail pieces is also important from a customer-centric point of view. If a billing statement for a particular customer was of interest to the organization, a system according to the present invention would allow the status of that statement to be determined within the system. Preferably, the system can also relate reply mail pieces, returned from the customer, back to the original outgoing mail piece. This allows closed loop tracking of the entire cycle of communication represented by the mail piece. Real time monitoring of individual mail pieces allows real time responsive actions (such as reprint, customer communications and notifications) based on mail piece status changes throughout the mail production process. Document lifecycle tracking also tracks the document through delivery, receipt and responses received pursuant to the produced document.

The system of the present invention uses the identity of the individual documents and mail pieces to track through the processes. Content of the documents may be viewed by a remote operator at each stage in the document production system and the operator may take appropriate fulfillment action based on tracking of incoming replies.

The present invention includes a method for monitoring the status of documents created by a large scale document production and management processes. The production and management process may be comprised of a plurality of different stages including: utilizing a print stream to generate the documents, printing documents on a printer in accordance with the print stream, and forming completed mail pieces on an inserter from the printed documents in accordance with mail piece creation data files. Using the present invention a party receives information regarding the status of documents within these production and management process stages. A user may then select one of the stages for closer inspection of the status of documents.

For the selected stage, a graphical representation of a group of documents within the selected stage is displayed. The group of documents may include graphically distinct sub-groups. Thus an exemplary display might be a grid of blocks, each block representing a predetermined number of documents. The status of the documents within the sub-grouped blocks may displayed, for example by color coding.

Sub-group blocks may be selected for closer inspection and an expanded view may display a graphical representation of individual documents. Individual documents may be represented by color coded blocks, the color codes indicating the status of individual documents. For example at an inserting stage, color coded status indicators may include: normal status, repaired status, rejected status, abnormal status, completed status, outsorted status, removed status, jammed status, and inserting status. If a user further selects an individual document, details about the document, and even an image of the document itself may be displayed.

Further details of the present invention are provided in the accompanying detailed description, figures and claims.

DETAILED DESCRIPTION

Figure 1:
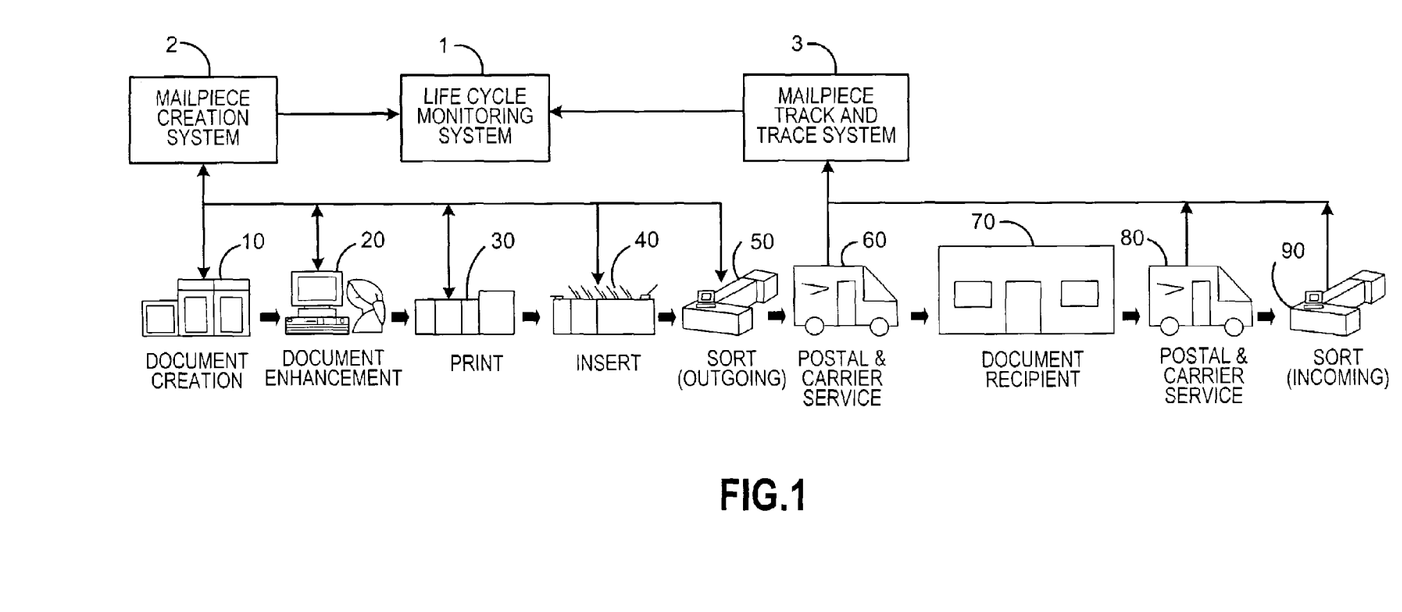
FIG. 1 is a high level depiction of a mail piece lifecycle and a system for monitoring documents within that lifecycle.

An overview of the present invention may be understood in reference to FIG. 1. A lifecycle monitoring system 1 serves as a gathering point for document information from the closed loop lifecycle of mail piece communications. Much of the information regarding status of the documents comes from the same system that oversees creation of the documents and mail pieces. Thus, the mail piece creation system 2 typically includes document print stream information, mail piece creation instructions, and information on the status of documents within the mail production equipment. All such information is of interest and is passed to the lifecycle monitoring system 1. The mail piece creation system 2 receives document and mail piece information from the various mail production stages including document creation 10, document enhancement 20, printing 30, inserting 30, and outgoing sorting 50. Information from later stages of the mail piece lifecycle are provided to the lifecycle monitoring system 1 via a mail piece tracking and tracing system 3. Known systems for tracking mail pieces within the carriers' delivery systems are used to gather information during the carrier service deliver stage 60.

After the document recipient 70 has received the mail piece a reply mail piece is put back into the mail stream for delivery back to the sender via the carrier service in the reply delivery stage 80. Typically, such reply mail pieces are provided to the recipient 70 as a reply envelope or card included within the original mail piece. Such pre-prepared reply mail pieces are marked with codes so that they too may be tracked in the during the reply delivery stage 80. When the reply mail piece is received at the original sender, it undergoes an incoming sorting stage 90 where documents are sorted and prioritized for internal processing. The incoming sorting stage preferably includes sensors for scanning the codes on the incoming reply mail pieces for identifying the mail piece and relating it back to the original correspondence that was sent out. As depicted in FIG. 1, the information gathered from the incoming sorting stage 90 is provided through the mail piece track and trace system 3 to the lifecycle monitoring system 1. Alternatively, the incoming sorting stage 90 may send data directly to the lifecycle monitoring system 1, or through an alternate subsystem, such as the creation system 2.

An exemplary carrier service for stages 60 and 90 is the U.S. Postal Service. Using the USPS, PLANET barcodes provide unique identifier information, which is relayed by the USPS automatically to the mailer so that the document tracking process continues even after the mail piece has left the mailer's facilities. As mail pieces arrive at different locations in the USPS system, a party using the lifecycle tracking system 1 can prepare for acting upon reply communications. Since all of the mail pieces are uniquely identified, effectiveness of the mailings (such as advertisement campaigns) can be measured and analyzed in real time.

In the preferred embodiment, during each of the lifecycle stages the document or mail piece, as it exists during that stage, is related back to a common identifier and a common record in the lifecycle monitoring system 1. The common identifier is preferably unique, although reasonably non-recurring identifiers also suffice. Identifiers may be a number, a name, or any kind of alphanumeric string. Thus, for example, a printed document in print stage 30, a finished sorted mail piece at sort stage 50, and a reply envelope during return delivery stage 80, will all be marked so that they may be identified, and such marks will all link back to the common identifier and record in the lifecycle monitoring system 1. During the various stages it may be necessary that the marks themselves be different to satisfy the respective sensing systems at the various stages. However, the life cycle monitoring system 1 relates the varied marks back to the single common identifier and record.

Figure 2:
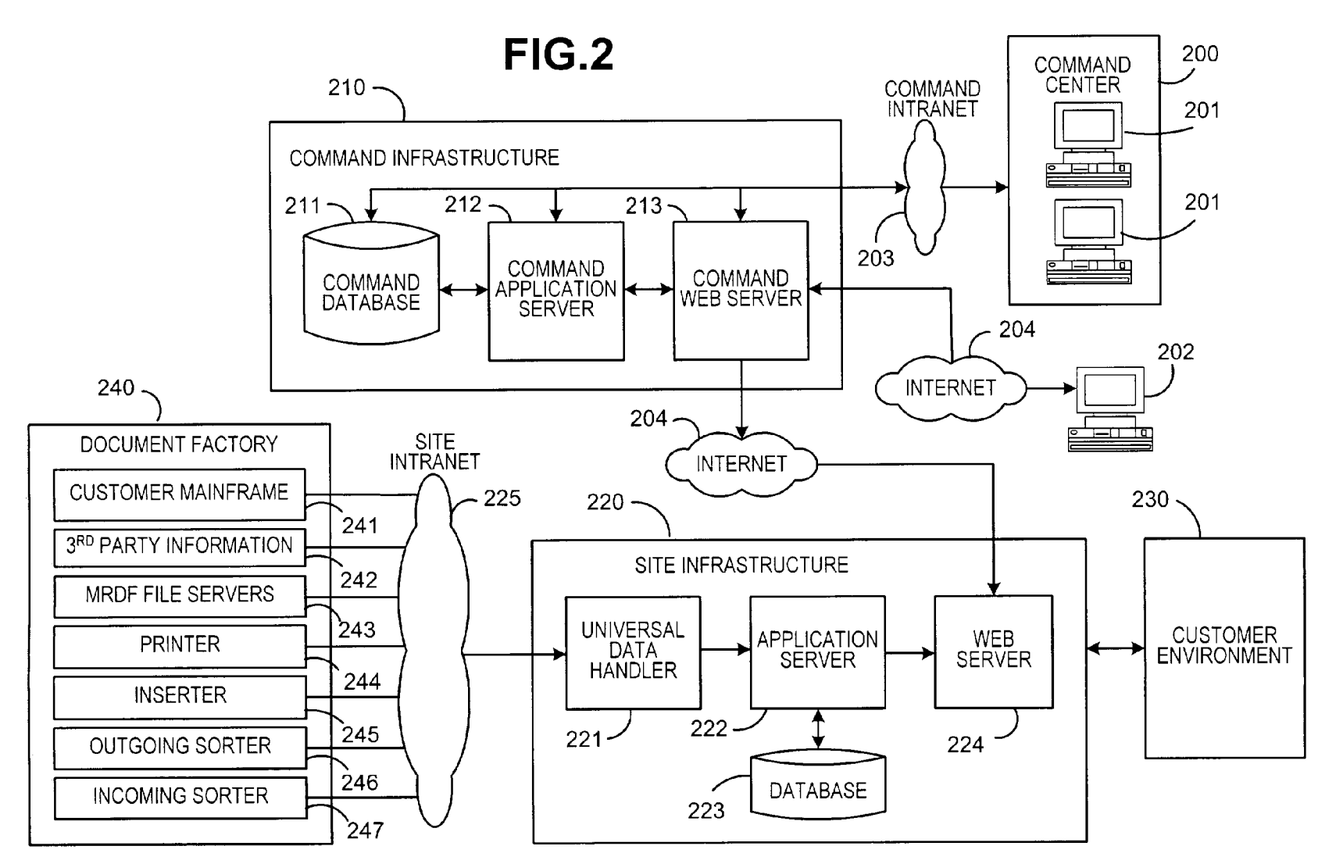
FIG. 2 is an exemplary system for implementing the present invention.

In FIG. 2, a system for implementing life cycle monitoring system 1 is depicted. Monitoring and control of lifecycle monitoring is preferably handled from a command center 200, which may or may not be geographically proximal to the site where documents are being created and formed into mail pieces. Preferably the command center 200 will be capable of monitoring document production sites at a plurality of remote and local locations. Terminals 201 within the command center 200 allow users to interface with the lifecycle monitoring system through a command intranet 203. Alternately, a remote terminal 202 may communicate to the command infrastructure 210 through a network 204, such as the Internet.

The command infrastructure 210 is preferably comprised of a command web server 213 to handle communications and data transfer with remote and local network locations. A command application server 212 includes the computer hardware and software for gathering and presenting the lifecycle information. Gathered mail piece lifecycle data is stored at the command location in the command database 211, which is accessed by the command application server 212 for providing lifecycle monitoring information to the terminals 201 and 202.

For the exemplary embodiment shown in FIG. 2, the command infrastructure 210 is depicted in communication with the mail piece creations system 2 and the corresponding lifecycle stages 10, 20, 30, 40, 50, and 90 through an Internet network connection 204. In this example, a site infrastructure 220 for the present invention is located at the site where the documents are being processed by a document factory 240. The local site also includes a customer computer environment 230, which interfaces and cooperates with the lifecycle tracking features of the present invention. The particular document factory 240 of this example includes the customer mainframe 241, which generates the original printstream information. Printstream data from the mainframe 241 may be transmitted to the command application server 212 to allow a virtual image of the document to be generated at the command center 200 for documents that are tracked by the system.

The document factory 240 also includes third party information 242. Information 242 may include additional information that is to be included with the mail piece, such as that added during a document enhancement stage 20. Third party information 242 may include identification of inserts, advertisements, or special offers that are intended to be part of the mail piece, but that may not have been generated in the print stream from the legacy mainframe 241. The third party information 242 helps to provide complete knowledge about the mail piece tracked by the lifecycle monitoring system 1.

Data from the MRDF file servers 243 is also preferably gathered as part of the present invention. MRDF stands for Mail Run Data File. The MRDF includes the instructions for assembling the mail pieces in the inserter machine 245. Each mail piece typically is uniquely identified in the MRDF, and the appropriate instructions for assembling the printed documents with the associated inserts, and generating an appropriate envelope with the appropriate postage is stored in the MRDF file servers 243. The MRDF Output Files and database also updated to indicate the status of mailpieces within the inserter system, as the MRDF file servers 243 control the creation of the mail pieces. Accordingly, the MRDF files include very useful data for understanding the nature and status of mail pieces in the document production lifecycle.

In the example of FIG. 2, a printer 240 is also located at the document factory. The printer receives the printstream, often after a document enhancement stage 20, and prints the thousands of documents that form the customer bills, or other mailing content, as the case may be. Printing is a major step in the document production process. As such, status data for a document within the print stage is important for lifecycle tracking and is preferably provided accordingly.

In addition to the MRDF data discussed above, document status data is gathered directly from the inserter machines 245. The inserters 245 include sensors and scanners for detecting the status of documents. For example if a document is mishandled or damaged, a record may be made indicating such. Such a record may typically be stored in the MRDF and may also be provided independently to the lifecycle monitoring system. Also, the status of the machine 245 itself is of interest in tracking and monitoring. For example, a delay in machine 245 operation due to mechanical problems may be of interest in lifecycle tracking, although such delay may not be reflected in any files particular to a mail piece.

After a mail piece is assembled in the inserter, it can be sorted for expedited delivery by the delivery service on an outgoing sorter 246. From the outgoing sorter 246 a scanner may record and provide data as to when sorting is complete, and when the mail piece is sent into the delivery mail stream. Further, an image of the outgoing mail piece may be captured and stored for lifecycle tracking purposes.

Finally, at this exemplary document factory 240, an incoming sorter 247 senses incoming mail pieces and the document lifecycle monitoring system 1 can relate a code scanned from the incoming mail piece to a particular item of outgoing mail. By relating the outgoing and incoming mail, the communication loop with the customer is completed.

Data from the various components of the data factory 240 are transmitted via the site intranet 225 to the site infrastructure 220. At the site infrastructure 220, a universal data handler 221 is capable of handling the diverse types of data to be used for lifecycle monitoring from the varied sources. The site infrastructure also includes a local application server 222, a database 223 and a web server 224.

The universal data handler 221 provides the ability to receive document production data from a variety of different sources having different formats, and to ensure that the data is properly processed and streamed to the command infrastructure 210 in the manner desired by users of the lifecycle tracking system 1. The universal data handler 210 is also capable of handling the high volume of data that is generated in a high volume such as document factory 240. The universal data handler 210 preferably includes a streaming framework implementing a mechanism to stream events (data) to registered users at the command center 200.

Figure 3:
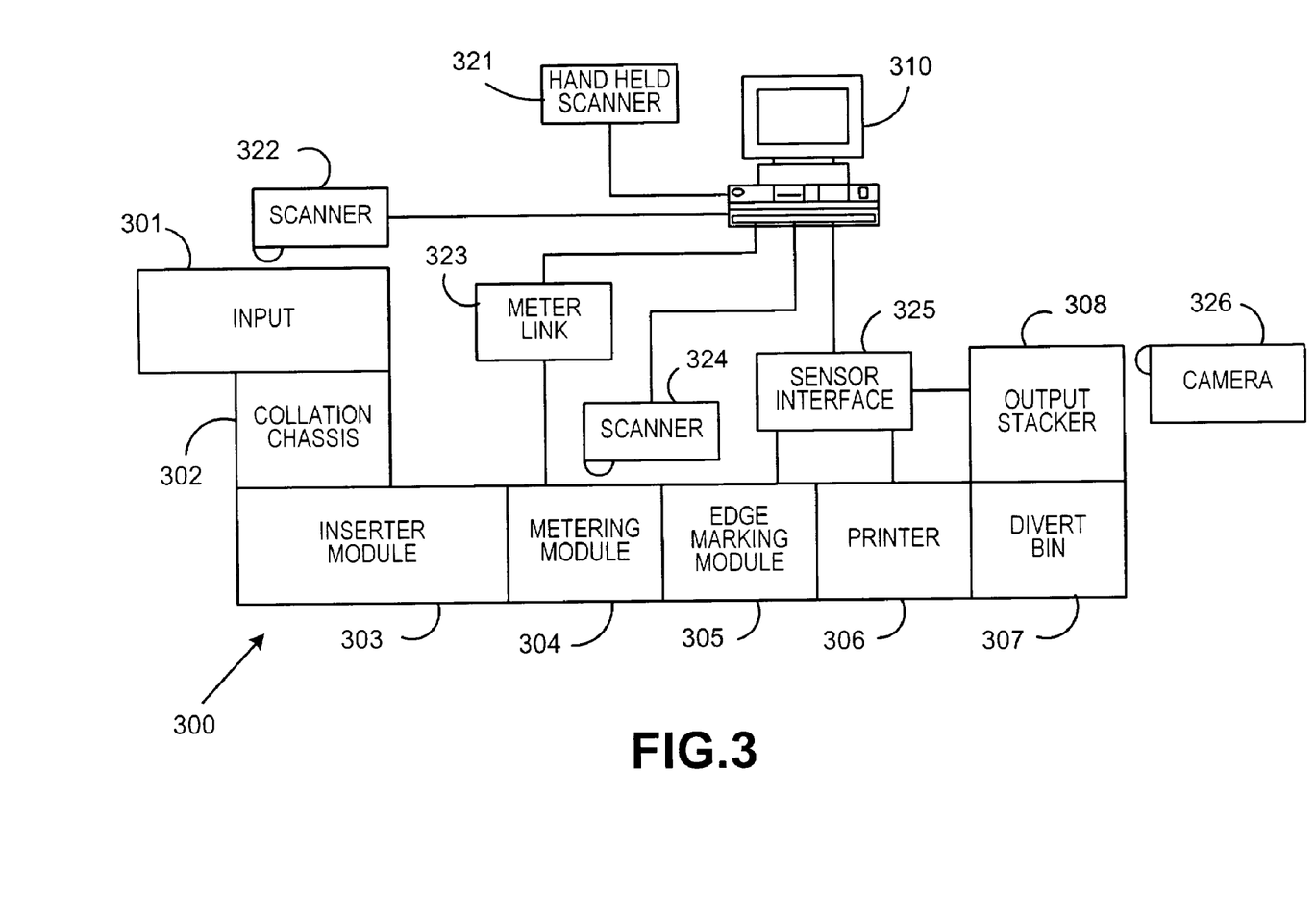
FIG. 3 is an exemplary arrangement of document status sensing devices for use with an inserter system.

FIG. 3 provides an exemplary inserter 300, with accompanying sensors and computer control, as may be used with the present invention. A local computer 310 provides the processing instructions to the inserter system 300 and receives the sensor information from the inserter. In addition to receiving information from sensors mounted in the inserter device 300, a hand held scanner 321 is connected to the computer 310 and may be used by an operator to scan and identify mail pieces as appropriate. For example, if a mail piece is damaged and must be reprocessed, an operator may use the hand held scanner 321 to identify the piece and make an appropriate notation in the MRDF files.

Within the inserter, a scanner 322 typically identifies the codes marked on documents as they are fed into the inserter system at the input mechanism 301. The scanner 322 may also check each document as it passes, and compare the data on the document with data in the corresponding print stream file. From this comparison it may be determined if an error has occurred, and an indication may be provided indicating an error. Using this information, the lifecycle tracking system 1 may indicate corrective action that must be taken.

As discussed previously, a collation chassis 302 collects documents and inserts together, and the collations are stuffed into envelopes in an inserter module. Stuffed envelopes can be metered at a metering module 304. Such metering activity is in turn monitored and controlled through meter link 323 by local computer 310. Such metering information is further supplied for lifecycle tracking purposes. A scanner 324 further tracks the progress of documents through the inserter machine by looking for the codes on the documents indicating that the corresponding mail piece has reached the stage at which the scanner 324 is positioned. Scanners 324 may be located at any points within the inserter system 300. Further inserter processing may be carried out at an edge marking module 305 and a printer 306 for putting delivery information onto the stuffed envelopes. Sensors within those modules communicate with sensor interface 325 to provide machine status and document status information to the local computer 310. A divert bin 307 collects misprocessed mail pieces. Preferably, sensors indicate when a mail piece is sent to the divert bin, and a record is made that further processing is required. Finally, an output stacker 308, sorts the finished mail pieces by postal codes in order that the sender may receive postal presorting discounts. In the preferred embodiment, a camera 326 captures an image of the completed envelope, and such image is associated with the file for the mail piece in the lifecycle monitoring system.

Figure 4:
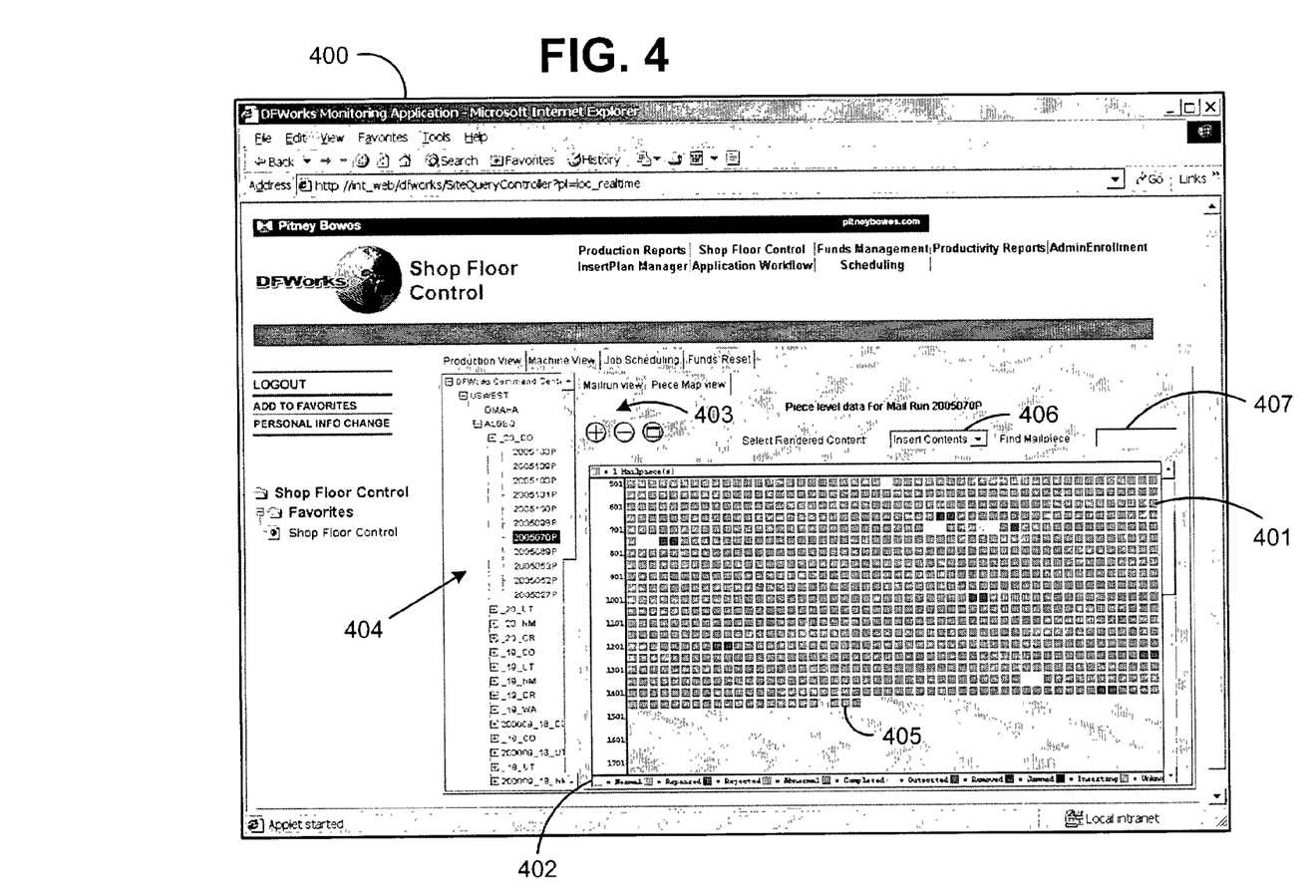
FIG. 4 is an exemplary display of mail piece status using the present invention.

FIG. 4 depicts an exemplary display of document lifecycle tracking information in a preferred format according to the present invention. Screen 400 includes a grid 401 of individual blocks 405 with each block 405 representing one or more mail pieces. In this particular example, the blocks 405 each represent a single mail piece, however by selecting an expanded view via zoom buttons 403 the blocks 405 may represent groups of ten, a hundred, a thousand, or any multiple of mail pieces. By manipulating the zoom buttons 304, the zoom resolution may be adjusted to any of the different levels of allowed by the system. A grid may be selected to represent the status of the mail pieces in one or more predefined stages in the document production process. Preferably the screen 400 will include an indication of how may mail pieces are represented by each block 405 on the grid 401 in the present view.

Each block 405, is also preferably color coded in accordance with a legend 402 to indicate the status of the document for a selected process. For example, if a group of mail pieces is being examined for their current print process status, the colors indicate whether or not the document was printed. For an insert process, the colors may indicate whether or not the mail pieces was sensed by an inserter, and where on the inserter it is currently located, and where it was located after processing. The insert color codes may also indicate whether the particular mail pieces were successfully or unsuccessfully processed. For the sorting process, the colors may indicate whether the mail piece was sorted. For the reply sorting process, colors may indicate whether or not a reply relating to the individual mail piece, such as a payment envelope or a reply card has been received.

If the selected zoom level is such that the blocks 405 represent more than one mail piece, the presence of a "negative" color code will indicate that one or more mail pieces in that group have the negative condition. For example, if a block 405 representing 100 mail pieces is indicated as not having been printed, then the color code represents that within the 100 represented documents, at least one or more has not completed printing.

In menu 404, a user may select which the particular mail run for which document lifecycle information is desired. This menu 404 may also provide the ability to select data from one of a plurality of remote document factory sites that are monitored by the command infrastructure 210.

A mail piece finder 407 interface allows an operator to locate a particular mail piece based on a record number piece ID, the name of the recipient, or any other information which may be particular to the mail piece. When one or more mail pieces matching the search criteria is found a list is provided and the grid 401 may zoom in on identified mail pieces. Using menu 406, a user may select to see what type of rendered information content will be shown when an individual mail piece 405 is selected.

The display 400, showing inserter information in accordance with the present invention, reports the status of inserts and document completion processes. Detailed views can indicate the status of inserts and the specific contents of each envelope. Incomplete, lost, and missing document are appropriately flagged via the color codes on the display.

Figure 5:
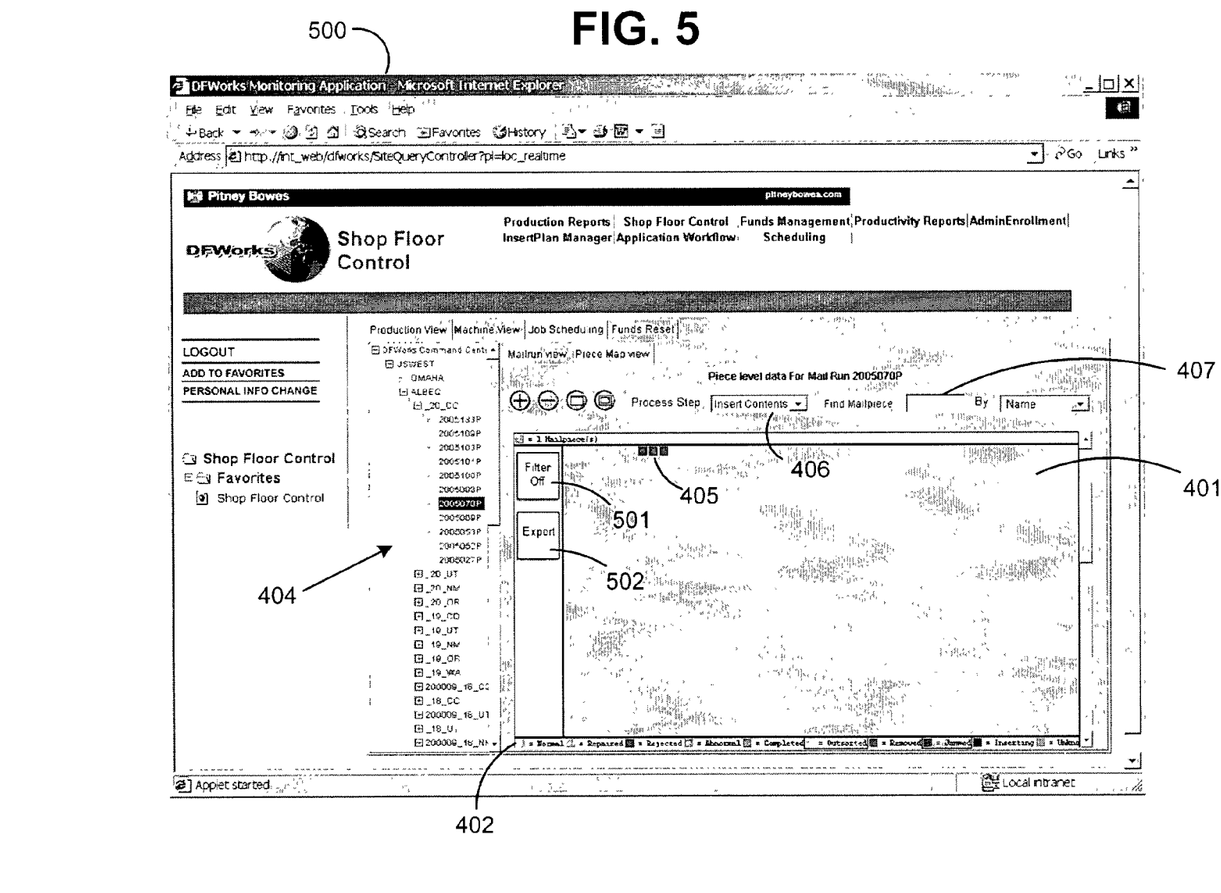
FIG. 5 is an exemplary mail piece status display with a status filter applied.

In FIG. 5, screen 500 depicts a further filtering functionality for displaying mail piece lifecycle information. A user may select to apply a filter to display only those mail pieces in grid 401 that include one or more status conditions. Any of the monitored status conditions may be selected. When the filter is applied only mail pieces 405 having the particular status will be displayed. The filter may be activated or deactivated via filter button 501. Also, when a particular mail piece having an identified condition is selected, an export button 502 may be activated to forward instructions and information about the selected mail piece to a selected destination. The forwarded instructions and information may activate whatever reprocessing that may be required. Potential export destinations may include a printer, an email, or fax notification to an operator to take action.

Figure 6:
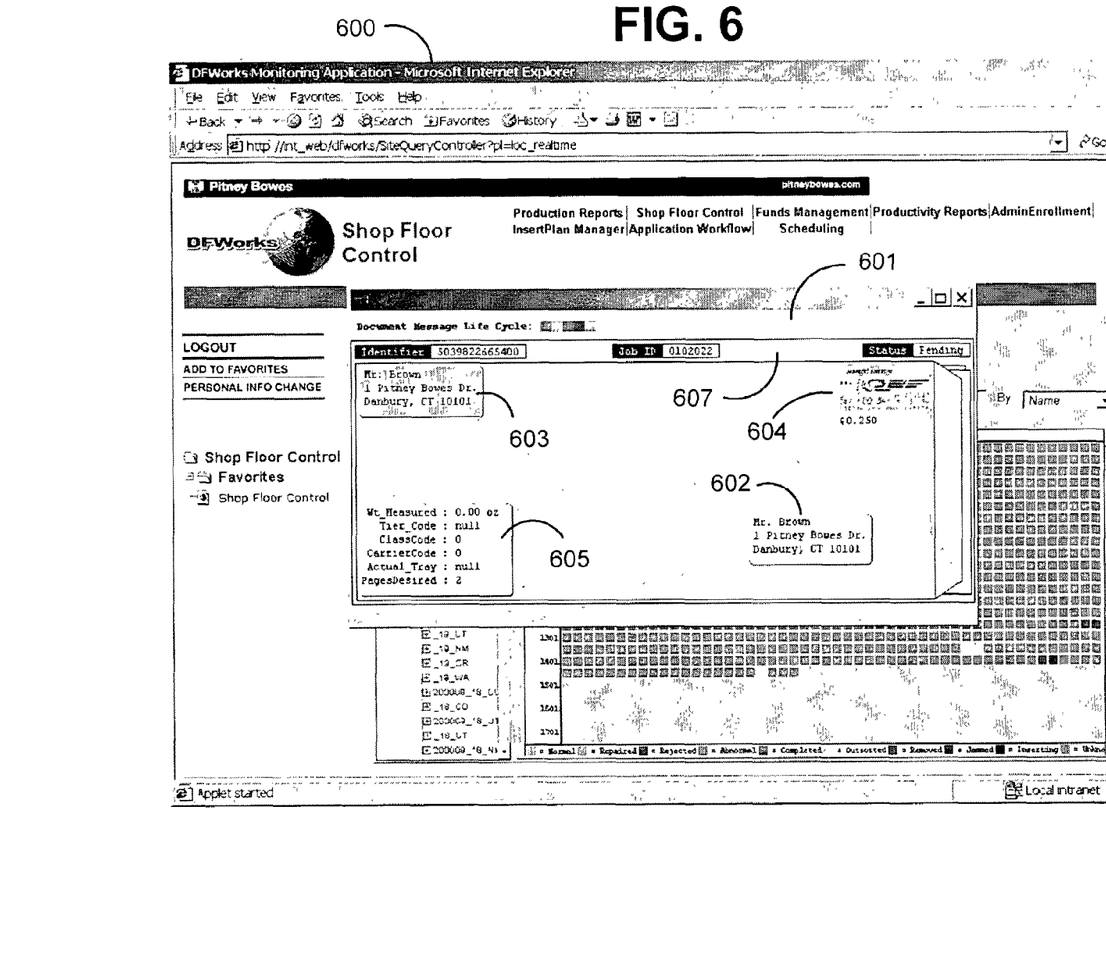
FIG. 6 is an exemplary display of extended information for a selected mail piece.

In FIG. 6, a preferred display of particularized information regarding an individual mail piece is depicted in accordance with the present invention. When an individual mail piece 405 is selected, a mail piece window 601 may appear and provide detailed information about the status and content of the mail piece. In particular, the addressee 602, return address 603, postage information 604, processing data 605 may all be displayed. Document ID, job ID and the document status are indicated in the status bar 607. The particularized document data is gathered from the plurality of data sources available to the lifecycle tracking system. For example, the image of the envelope in screen 601 may be a virtual representation of what the envelope would look like based on the known printing information from the MRDF and print stream, or the image may be a camera shot of the actual envelope taken at the outgoing sorter. In the preferred embodiment, in addition to showing envelope data, corresponding images of the document (bills, statements, etc.) can be similarly shown.

Figure 7:
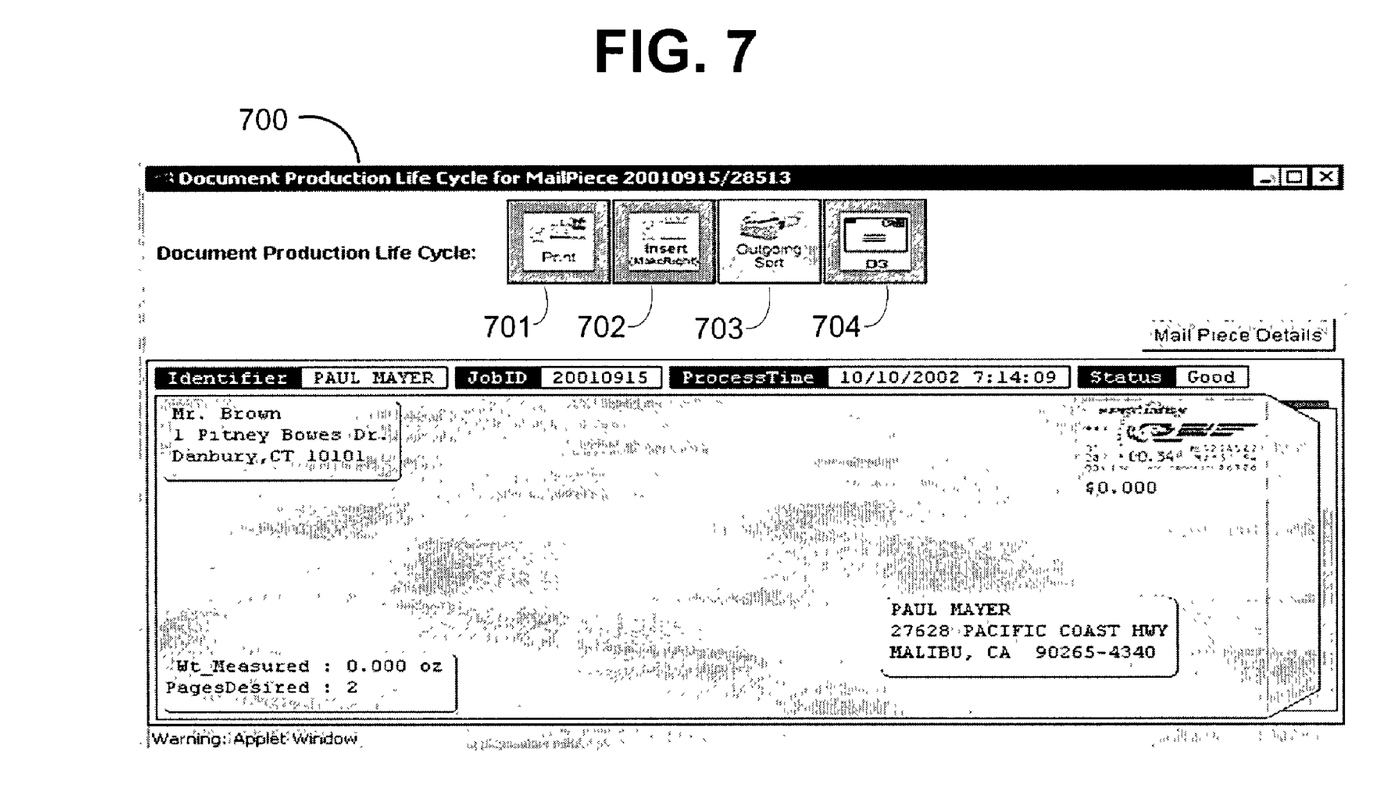
FIG. 7 depicts a preferred embodiment for selecting a document lifecycle process stage for closer investigation.

FIG. 7 depicts a screen 700 similar to that of screen 601. In addition to the detailed information provided by screen 601, four life cycle stage selection buttons 701, 702, 703, and 704 are available to allow the user to select which lifecycle stage for information is desired. The selection of one of the four buttons can result in stage information being provided for the particular selected mail piece, and may also be a means for selecting the stage to view in screen 400. Exemplary print stage button 701 allows the user to see the status of the single or group of documents during the print stage 30. Exemplary insert stage button 702 allows the user to see the status of the one or more documents during the insert stage, as depicted in FIG. 4. In FIG. 7, the outgoing sort stage button 703 has been selected and the detailed information on screen 700 is providing the detailed information gathered from the outgoing sort stage. In the preferred embodiment there may be an electronic document presentment button 704 that will provide an electronic rendition of the documents in the mail piece when selected. In the preferred embodiment the electronic rendition is created for on screen presentment by recreating the documents from printstream that corresponds to the mail piece. Software for such document presentment is known in the art, an example of which is the Digital Document Delivery™ system from Pitney Bowes Inc.

The data gathering, monitoring, and presentation system for use in document lifecycle tracking in accordance with the present invention provides the ability to track documents as they pass through an automated document factory, then the postal delivery system and then ultimately on the return path back to the original mailer. This ability may assist, for example, in efficient and effective management of sales campaigns. Historical data about past mail piece lifecycles makes it possible to project results for present and future campaigns. For instance, if the documents are currently being inserted, then history may show that they are typically delivered in two to four days, and history may further show that orders start to arrive in five to eight days. As the documents pass through the creation, preparation, insertion, sortation, and postal delivery stages, the estimates become more precise and the ranges of uncertainty are reduced. Finally, the actual orders can be tracked from the time that they are mailed back to the arrival at the vendors facility.

An exemplary campaign status can be measures with as much or as little detail as the mailer wishes. Data can be gathered by ZIP code regarding delivery of the mail pieces and the early responses. The present invention provides a useful customer relation management tool for test mailings or comparisons of different marketing strategies that report data virtually in real time. For instance using the present invention it may be found that offer A is resulting in a 15% response from one ZIP code, while offer B is resulting in only a 2% response in that zip code, but is doing very well in a different ZIP code. Changes in marketing approach may be advised to maximize the effectiveness of the campaign.

The system of the present invention can track individual mail pieces in real time and alert users to problems. If a document is damaged and requires reprinting, a mailer may decide to send a notification, for example by email, to tell the customer that the document will be arriving later than expected.

Thus, although the invention has been described with respect to a preferred embodiment thereof, it will be understood by those skilled in the art that the foregoing and various other changes, omissions and deviations in the form and detail thereof may be made without departing from the scope of this invention, as further described in the following claims.

What is claimed is:

1. A method for monitoring status of documents created by a large scale document production and management process, the production and management process including a plurality of stages including: utilizing a print stream to generate the documents, printing the documents on a printer in accordance with the print stream, and forming completed mail pieces on an inserter from the printed documents in accordance with mail piece creation data files; the method comprising:

receiving information regarding status of documents within the inserter stage;

displaying, by a computer screen, a graphical representation of a group of documents within the inserter stage, the graphical representation of the group of documents including graphically distinct sub-groups, the status of the documents within the sub-groups being graphically represented in the sub-group displays;

selecting a sub-group for closer inspection; and displaying, by the computer screen, the selected sub-group in an expanded form including a graphical representation of individual documents, the graphical representation of individual documents indicating the status of the individual documents;

wherein the steps of displaying graphical representations of documents include representing sub-groups of documents and individual documents in a grid pattern wherein consecutive representations in the grid pattern represent consecutive sub-groups of documents and consecutive individual documents.

2. The method of claim 1 wherein displaying graphical representations of the status of individual documents includes providing representations for one or more status conditions, the one or more status conditions selected from the group consisting of: normal status, repaired status, rejected status, abnormal status, completed status, outsorted status, removed status, jammed status, and inserting status.

3. The method of claim 2 wherein the steps of displaying graphical representations of status include providing color coded graphical representations of documents.

4. The method of claim 1 wherein displaying graphical representations of the status of the sub-groups of documents includes providing representations for one or more status conditions for the sub-groups based on conditions of individual documents within the sub-groups, the status conditions selected from the group consisting of: normal status, repaired status, rejected status, abnormal status, completed status, outsorted status, removed status, jammed status, and inserting status.

5. The method of claim 4 wherein displaying graphical representations of status includes providing color coded graphical representations of documents.

6. The method of claim 1 further comprising the steps of:

selecting a status condition filter to apply to the graphical representations of sub-groups or individual documents; and displaying only those graphical representations of sub-groups or individual documents that satisfy the selected status condition filter.

7. The method of claim 1 further comprising the steps of:

selecting an individual document for closer inspection and, based on the selection of the individual document, displaying processing information about the selected individual document.

8. The method of claim 7 wherein the displayed processing information includes a visual reproduction of the selected individual document generated based on data from the print stream.

9. The method of claim 7 wherein the displayed processing information includes a visual reproduction of the selected individual document based on a camera image of the selected individual document captured during processing.

10. A method for monitoring status of documents created by a large scale document production and management process, the production and management process including a plurality of stages selected from the group consisting of: utilizing a print stream to generate the documents, printing the documents on a printer in accordance with the print stream, forming completed mail pieces on an inserter from the printed documents in accordance with mail piece creation data files, sorting the completed mail pieces on an outgoing sorter in accordance with carrier service specifications, delivering the completed mail pieces to a recipient by a carrier service, delivering a response mail piece from the recipient by the carrier service, and sorting the response mail piece at an incoming sorter; the method comprising:
    receiving information regarding the status of documents within the plurality of stages;
    selecting one of the plurality of stages for closer inspection of the status of documents within the selected stage;
    displaying, by a computer screen, a graphical representation of a group of documents within the selected stage, the graphical representation of the group of documents including graphically distinct sub-groups, the status of the documents within the sub-groups being graphically represented in the sub-group displays;
    selecting a sub-group for closer inspection; and
    displaying, by the computer screen, the selected sub-group in an expanded form including a graphical representation of individual documents, the graphical representations of individual documents indicating the status of the individual documents;
    wherein the steps of displaying graphical representations of documents include representing sub-groups of documents and individual documents in a grid pattern wherein consecutive representations in the grid pattern represent consecutive sub-groups of documents and consecutive individual documents.

11. The method of claim 10 wherein displaying graphical representations of the status of individual documents includes providing representations for one or more status conditions.

12. The method of claim 11 wherein displaying graphical representations of status includes providing color coded graphical representations of documents.

13. The method of claim 10 wherein displaying graphical representations of the status of the sub-groups of documents includes providing representations for one or more status conditions for the sub-groups based on conditions of individual documents within the sub-groups.

14. The method of claim 13 wherein displaying graphical representations of status includes providing color coded graphical representations of documents.

15. The method of claim 10 further comprising the steps of:
    selecting a status condition filter to apply to the graphical representations; and
    displaying only those graphical representations of sub-groups or individual documents that satisfy the selected status condition filter.

16. The method of claim 10 further comprising the steps of:
    selecting an individual document for closer inspection and, based on the selection of the individual document, displaying processing information about the selected individual document.

17. The method of claim 16 wherein the displayed processing information includes a visual reproduction of the selected individual document generated based on data from the print stream.

18. The method of claim 16 wherein the displayed processing information includes a visual reproduction of the selected individual document based on a camera image of the selected individual document captured during processing.

19. A method for monitoring the status of documents created by a large scale document production and management process, the production and management process including a plurality of stages selected from the group consisting of: utilizing a print stream to generate the documents, printing the documents on a printer in accordance with the print stream, forming completed mail pieces on an inserter from the printed documents in accordance with mail piece creation data files, sorting the completed mail pieces on an outgoing sorter in accordance with carrier service specifications, delivering the completed mail pieces to a recipient by a carrier service, delivering a response mail piece from the recipient by the carrier service, and sorting the response mail piece at an incoming sorter, each document within the production and management process having a unique identifier; the method comprising:
    specifying the unique identifier of a particular document, the unique identifier applicable to the particular document across all of the plurality of stages;
    displaying, by a computer screen, the current stage and status of the particular document, as identified by the unique identifier; and
    displaying, by the computer screen, processing information for the particular document wherein the displayed processing information includes a visual reproduction of the particular document generated based on data from the print stream.

20. A method for monitoring the status of documents created by a large scale document production and management process, the production and management process including a plurality of stages selected from the group consisting of: utilizing a print stream to generate the documents, printing the documents on a printer in accordance with the print stream, forming completed mail pieces on an inserter from the printed documents in accordance with mail piece creation data files, sorting the completed mail pieces on an outgoing sorter in accordance with carrier service specifications, delivering the completed mail pieces to a recipient by a carrier service, delivering a response mail piece from the recipient by the carrier service, and sorting the response mail piece at an incoming sorter, each document within the production and management process having a unique identifier; the method comprising:
    specifying the unique identifier of a particular document, the unique identifier applicable to the particular document across all of the plurality of stages;
    displaying, by a computer screen, the current stage and status of the particular document, as identified by the unique identifier; and
    displaying, by the computer screen, processing information for the particular document wherein the displayed processing information includes a visual reproduction of the particular document based on a camera image of the particular document captured during processing.

21. A method for monitoring the status of documents created by a large scale document production and management process, the production and management process including a plurality of stages selected from the group consisting of: utilizing a print stream to generate the documents, printing the documents on a printer in accordance with the print stream, forming completed mail pieces on an inserter from the printed documents in accordance with mail piece creation data files, sorting the completed mail pieces on an outgoing sorter in accordance with carrier service specifications, delivering the completed mail pieces to a recipient by a carrier service, delivering a response mail piece from the recipient by the carrier service, and sorting the response mail piece at an incoming sorter, the method comprising:

storing records relating to individual documents processed by the production and management process, each record being identified by a non-recurring identifier;

monitoring, by a computer system, the status of the individual documents during the plurality of stages in the production and management process;

relating the monitored status of the individual documents to the non-recurring identifiers;

updating the stored records to indicate the monitored status of the individual documents throughout the production and management process; and displaying, by a computer screen, the status of one or more of the individual documents during the production and management process based on the updated stored records that are related to the non-recurring identifiers;

wherein the step of displaying the status of one or more of the individual documents includes providing color coded graphical representations of the individual documents, the color coded representations indicating status conditions as different colors.

* * * * *